US011949352B2

(12) United States Patent
Gertjegerdes et al.

(10) Patent No.: US 11,949,352 B2
(45) Date of Patent: Apr. 2, 2024

(54) METHOD FOR CONTROLLING A GENERATOR OF A WIND TURBINE

(71) Applicant: Wobben Properties GmbH, Aurich (DE)

(72) Inventors: Stefan Gertjegerdes, Aurich (DE); Jair Cassoli, Aurich (DE)

(73) Assignee: Wobben Properties GmbH, Aurich (DE)

( * ) Notice: Subject to any disclaimer, the term of this patent is extended or adjusted under 35 U.S.C. 154(b) by 763 days.

(21) Appl. No.: 17/255,234

(22) PCT Filed: Jun. 17, 2019

(86) PCT No.: PCT/EP2019/065902
§ 371 (c)(1),
(2) Date: Dec. 22, 2020

(87) PCT Pub. No.: WO2019/243265
PCT Pub. Date: Dec. 26, 2019

(65) Prior Publication Data
US 2021/0119563 A1    Apr. 22, 2021

(30) Foreign Application Priority Data
Jun. 22, 2018 (DE) .................. 10 2018 115 114.4

(51) Int. Cl.
*H02P 21/00* (2016.01)
*F03D 7/04* (2006.01)
(Continued)

(52) U.S. Cl.
CPC .......... *H02P 21/0003* (2013.01); *F03D 7/042* (2013.01); *F03D 9/25* (2016.05);
(Continued)

(58) Field of Classification Search
CPC ..... H02P 25/22; H02P 21/0003; H02K 7/183; F03D 9/25; F03D 7/042
(Continued)

(56) References Cited

U.S. PATENT DOCUMENTS 5,225,712 A * 7/1993 Erdman .................. H02P 21/06
290/55
2005/0073280 A1   4/2005 Yoshinaga et al.
(Continued)

FOREIGN PATENT DOCUMENTS

CN      103840480 A     6/2014
CN      106257821 A    12/2016
(Continued)

OTHER PUBLICATIONS

Abou-Qamar et al., "Cancellation of harmonic torque disturbance in permanent magnet synchronous motor drives by using an adaptive feedforward controller," *IET Power Electronics*, 11(14):2215-2221, 2018. (7 pages).

*Primary Examiner* — Erick D Glass
(74) *Attorney, Agent, or Firm* — Seed IP Law Group LLP (57) ABSTRACT

Provided is a method for controlling, by means of field-oriented closed-loop control, an active rectifier which is electrically connected to a stator of a generator of a wind turbine. The generator has a rotor which is mounted so as to be rotatable about the stator and comprises the steps of determining a mechanical position of the rotor with respect to the stator, predefining DC components of rotor-fixed d and q coordinates for at least one 3-phase stator current, determining an AC component for the q coordinate at least as a function of the mechanical position of the rotor, modulating the determined AC component of the q coordinate onto the predefined DC component of the q coordinate, so that a modulated q coordinate is produced which has a DC component and an AC component, and controlling the active
(Continued)

rectifier at least as a function of the modulated q coordinate and preferably as a function of the d coordinate.

19 Claims, 7 Drawing Sheets

(51) Int. Cl.
*F03D 9/25* (2016.01)
*H02K 7/18* (2006.01)
*H02P 25/22* (2006.01)

(52) U.S. Cl.
CPC ............ *H02K 7/183* (2013.01); *H02P 25/22* (2013.01); *F05B 2220/7062* (2013.01); *F05B 2270/326* (2013.01); *F05B 2270/342* (2020.08)

(58) Field of Classification Search
USPC .................................................. 318/400.02
See application file for complete search history.

(56) References Cited

U.S. PATENT DOCUMENTS

| | | | |
|---|---|---|---|
| 2006/0061319 A1* | 3/2006 | Markunas | ............... H02P 21/26 318/712 |
| 2011/0018281 A1 | 1/2011 | Tan et al. | |
| 2011/0298405 A1 | 12/2011 | Costanzo et al. | |
| 2012/0206949 A1* | 8/2012 | Owen | ....................... H02P 9/48 363/127 |
| 2013/0320936 A1 | 12/2013 | Deng | |
| 2013/0320938 A1 | 12/2013 | Deng et al. | |
| 2015/0263637 A1 | 9/2015 | Wu | |
| 2015/0381092 A1* | 12/2015 | Wang | ...................... H02P 21/12 318/400.02 |
| 2016/0336834 A1 | 11/2016 | Diedrichs | |
| 2018/0069499 A1 | 3/2018 | Engelken et al. | |
| 2021/0119563 A1 | 4/2021 | Gertjegerdes et al. | |
| 2022/0360139 A1 | 11/2022 | Cassoli et al. | |

FOREIGN PATENT DOCUMENTS

| | | |
|---|---|---|
| CN | 106415996 A | 2/2017 |
| DE | 102014204802 A1 | 9/2015 |
| DE | 10 2015 205 348 A1 | 9/2016 |
| DE | 102015205348 A1 | 9/2016 |
| EP | 2 043 255 A2 | 4/2009 |
| EP | 2485388 A1 | 8/2012 |
| EP | 2670027 A1 | 12/2013 |
| EP | 2 869 458 A1 | 5/2015 |
| EP | 2 919 380 A1 | 9/2015 |
| EP | 3 010 143 A1 | 4/2016 |
| EP | 3 258 594 A1 | 12/2017 |
| EP | 3 264 593 A1 | 1/2018 |
| EP | 3 297 156 A1 | 3/2018 |
| EP | 3 454 469 A1 | 3/2019 |
| IT | VA20100046 A1 | 12/2011 |
| WO | 2016/151014 A1 | 9/2016 |

* cited by examiner

Fig. 7

METHOD FOR CONTROLLING A GENERATOR OF A WIND TURBINE

BACKGROUND

Technical Field

The present invention relates to a method for controlling a generator of a wind turbine and to a control unit of a wind turbine. In addition, the present invention relates to a wind turbine which has such a control unit and/or carries out such a method.

Description of the Related Art

Wind turbines usually have a generator which comprises a stator and a rotor, wherein the stator has a rotational axis about which the rotor is mounted. An air gap is additionally located between the stator and the rotor.

During the operation of such a wind turbine, the generator may experience operational oscillations which result in increased emission of sound.

The reason for this may be, for example, slot cogging torques or pole cogging torques.

Such cogging torques are usually counteracted by making geometric changes to the design of the generator, for example, by means of what is referred to as skewing or slot skewing.

A disadvantage with such a procedure is that the desired effect usually occurs only at some working points of the wind turbine.

The German Patent and Trademark Office found the following prior arts in a search for the priority application relating to the present application: EP 2 485 388 A1, EP 2 670 027 A1, DE 10 2015 205 348 A1, US 2011/0 018 281 A1, US 2011/0 298 405 A1 and DE 10 2014 204 802 A1

BRIEF SUMMARY

A way of reducing sound emissions in generators of wind turbines is provided herein.

Provided is a method for controlling, by means of field-oriented closed-loop control, an active rectifier which is electrically connected to a stator of a generator, wherein the generator has a stator with a rotational axis about which the rotor is mounted. The generator is preferably embodied here as an internal rotor.

It is therefore proposed, in particular, to reduce the sound emissions of a generator of a wind turbine by means of an active rectifier which has field-oriented closed-loop control.

For this purpose, the control system of the active rectifier uses field-oriented closed-loop control. This permits the stator currents to be predefined in rotor-fixed d and q coordinates. The d and q coordinates themselves can be made available here, for example, by means of a d/q transformation.

It is therefore proposed, in particular, to predefine the stator currents $I_d$ and $I_q$ largely as equivalent variables.

In addition, a mechanical position of the rotor with respect to the stator is determined.

This can be done by means of positioning sensing means which is configured to acquire a mechanical position of the rotor and to output said position as an electrical variable in the form of an electrical angle.

An AC component for the q coordinate is then determined as a function of this mechanical position of the rotor. The AC component itself is here an alternating variable, that is to say, for example, a sine function.

The determined AC component of the q coordinate is then modulated onto the predefined DC component of the q coordinate in such a way that a modulated q coordinate which has a DC component and an AC component is generated. This can be done, for example, by means of an addition point in a corresponding control system.

Subsequent to this, the active rectifier is controlled at least as a function of the modulated q coordinate.

The q coordinate is therefore provided for setting the average torque of the generator, in particular to set it in such a way that the emission of sound of the generator is reduced.

It is particularly advantageous here that the method can be changed dynamically and it is therefore possible selectively to go into the various operating points of a wind turbine during ongoing operation. This is not possible, for example, by means of simple slot skewing since the skewing is predetermined at the works and can no longer be changed during ongoing operation.

The AC component for the q coordinate is preferably also determined as a function for a working character curve of the generator, wherein an amplitude and an offset for the DC component are preferably acquired from the working characteristic curve.

It is therefore proposed, in particular, that the q coordinate be set as a function of the working point of the wind turbine, for example, as a function of stored working characteristic curves or power characteristic curves. This is done, in particular, in such a way that the torque ripple of the generator and therefore the emissions of sound by the generator are reduced.

The method further comprises the steps: acquiring an electrical angle as a function of a mechanical position of the rotor and the number of pole pairs of the generator, wherein the active rectifier is additionally controlled as a function of the electrical angle.

It is therefore proposed, in particular, that the active rectifier be controlled both as a function of the position of the rotor and as a function of the number of pole pairs of the generator, in order to reduce the torque ripple and therefore the sound emissions of the generator.

It is preferably proposed that the generator, in particular the stator, comprises a first 3-phase winding system and a second 3-phase winding system which is in particular offset by 30° with respect to the first, and that the first 3-phase winding system is controlled as a function of a first electrical angle, and the second 3-phase winding system is controlled as a function of a second electrical angle, wherein the second electrical angle is different from the first electrical angle, and is phase-shifted, in particular by 30°, with respect to the first electrical angle.

It is therefore further proposed to implement the generator with two 3-phase stator systems, in order to reduce even further the torque ripple and therefore the sound emissions of the generator. For this purpose, it is in particular proposed to arrange the two electrical stators with a 30° offset in their phase.

The modulation is preferably carried out by means of n-th harmonic electrical oscillation, in order to minimize an m-th harmonic, mechanical oscillation of the generator, preferably where n=m/2 and m=12.

In one particular preferred embodiment, the operational oscillations which occur are therefore minimized with twelve times the electrical frequency, by virtue of the fact that modulation is carried out with the sixth harmonic.

The core of the idea here is that the partial currents lq1 and lq2 are not modulated identically with the frequency of the twelfth harmonic but rather the partial currents of the two partial systems, that is to say the two stators, are modulated with the frequency of the sixth harmonic.

The method preferably further comprises the steps: phase shifting an AC component of the q coordinate by a predetermined phase angle, wherein the phase angle is preferably 180° and/or phase shifting the electrical angle by a predetermined phase angle, wherein the phase angle is preferably 30°.

The active rectifier preferably comprises a first 3-phase module and a second 3-phase module, wherein the first 3-phase module is assigned to a first electrical stator, and the second 3-phase module is assigned to a second electrical stator.

In one preferred embodiment, a plurality of 3-phase rectifiers are therefore used. In this context, it is advantageous to use two identical modules, as a result of which the active rectifier is made more favorable over the whole system.

Alternatively it is proposed to use a 6-phase rectifier for the two stators. An advantage here the 6-phase rectifier is the easier to control in comparison with two 3-phase modules.

A control unit (controller) of a wind turbine is proposed, wherein the wind turbine has at least one generator which comprises a stator with a rotational axis about which a or the rotor is mounted, wherein the stator is electrically connected to an active rectifier which can be actuated by means of an actuation unit (actuator).

The control unit comprises here at least one position module for determining a mechanical position of the rotor with respect to the stator and is configured to output an electrical position signal which has been determined from the mechanical position of the rotor. For this purpose, the position module comprises, for example, an optical sensor which is configured to sense a rotational position of the rotor, and a processing unit (processor) which is configured to determine an electrical angle from the sensed rotational position.

In addition, the control unit also comprises a transformation module for predefining DC components of rotor-fixed d and q coordinates for at least one 3-phase stator current.

The transformation module is preferably configured here at least to carry out a d/q transformation and to make available the d and q coordinates determined from the transformation as DC components, for example, as $I_d$ and $I_q$.

Furthermore, the control unit also comprises a damping module for modulating at least one AC component onto a q coordinate. The damping module is therefore at least configured to determine an AC component as a function of an electrical position signal, preferably to determine it as a function of an electrical angle which provides definitive information about the mechanical position of the rotor with respect to the stator.

Moreover, the damping module is connected to the transformation module in such a way that a modulated q coordinate which has a DC component and an AC component can be generated, in particular in order to make available the q coordinate modulated in this way to an actuation unit of the active rectifier.

It is therefore proposed, in particular, to predefine to the actuation unit of the active rectifier a modulated q coordinate which comprises both a DC component and an AC component, wherein the AC component is provided to reduce the average torque ripple of the generator.

In order to control the active rectifier as a function of this modulated q coordinate, the actuation unit is at least configured to transform the modulated q coordinate back into a 3-phase coordinate, in particular in such a way that each of the three phases is actuated separately.

The damping module preferably has for this purpose a multiplication means (multiplier) which acts on the electrical position signal, in order in particular to make available a changed electrical position signal.

It is therefore also proposed to multiply the electrical angle of the position sensing means by a multiple, in order to correspondingly address corresponding generator properties and/or or the oscillation which is to be reduced. In one preferred embodiment the multiple comprises six.

The damping module preferably comprises an offset which acts on the electrical position signal, in particular on the changed electrical position signal, as a function of a working characteristic curve of the wind turbine by means of addition, in order to make available an offset electrical position signal.

The damping module preferably comprises a trigonometric function which outputs an essentially sinusoidal signal as a function of the electrical position signal, in particular as a function of the offset electrical position signal, in order to make available a changing electrical position signal.

The damping module preferably comprises an amplitude modification means which acts on the electrical position signal, in particular on the changing electrical signal, as a function of a working characteristic curve of the wind turbine, in order to make available the AC component.

The control unit preferably further comprises a phase shifter which is configured to shift the electrical position signal by a predetermined absolute value, in particular by 30°, in its phase, and to make it available at the control unit.

The control unit further preferably comprises a phase shifting module, which is configured to shift the modulated q coordinate by a predetermined absolute value, in particular by 180°, in its phase, in particular in order to make available a first modulated q coordinate for a first 3-phase stator current of a first 3-phase winding system of the stator of the wind turbine and a second modulated q coordinate for a second 3-phase stator current of a second 3-phase winding system of the stator of the wind turbine, wherein the first winding system and the second winding system are preferably phase shifted by 30°.

It is therefore proposed in particular that the generator have two electrical stators which are offset by 30° with respect to one another. As a result, the torque ripple can be reduced once more. In addition, this also simplifies the actuation of the active rectifier, since the latter has a 6-phase input or a double 3-phase input.

Proposed is a method for controlling, by means of field-oriented closed-loop control, an active rectifier which is electrically connected to a stator of a generator of a wind turbine, wherein the generator has a stator with a rotational axis about which the rotor is mounted. The generator is preferably embodied here as an internal rotor.

It is therefore proposed, in particular, to reduce the sound emissions of a generator of a wind turbine by means of an active rectifier which has field-oriented closed-loop control.

For this purpose, field-oriented closed-loop control is used to control the active rectifier. This permits the stator currents to be predefined in rotor-fixed d and q coordinates. The d and q coordinates themselves can be made available here, for example, by means of a d/q transformation.

It is therefore proposed, in particular, to predefine the stator currents $I_d$ and $I_q$ largely as equivalent variables.

In addition, a mechanical position of the rotor with respect to the stator is determined.

This can be done, for example, by means of a position sensing means which is configured to determine a mechanical position of the rotor and to output it as an electrical variable in the form of an electrical angle.

An AC component for the d coordinate is then determined as a function of this mechanical position of the rotor. The AC component itself is here an alternating variable, that is to say, for example, a sine function.

The determined AC component of the d coordinate is then modulated and/or added onto the predefined DC component of the d coordinate in such a way that a changed or modulated d coordinate which has a DC component and an AC component is generated.

This can be done, for example, by means of an addition point in a corresponding control system.

Subsequent to this, the active rectifier is controlled at least as a function of the changed or modulated d coordinate.

The d coordinate is therefore provided to set the magnetic excitation of the generator, in particular to set it in such a way that the emission of sound by the generator is reduced.

It is particularly advantageous here that the method can be changed dynamically and it is therefore possible to go into the various working points of a wind turbine selectively during ongoing operation. This is not possible, for example, by means of simple slot skewing since the skewing is predetermined at the works and can no longer be changed during ongoing operation.

The AC component for the d coordinate is preferably additionally determined as a function of a working characteristic curve of the generator, wherein an amplitude and an offset for the AC component are preferably acquired from the working characteristic curve.

It is therefore, in particular, proposed to set the d-coordinate as a function of the working point of the wind turbine, for example, as a function of stored working characteristic curves or power characteristic curves. This is done, in particular, in such a way that the sound emissions of the generator are reduced by means of the magnetic excitation.

The method preferably further comprises the steps: acquiring an electrical angle as a function of the mechanical position of the rotor and the number of pole pairs of the generator, wherein the active rectifier is additionally controlled as a function of the electrical angle.

It is therefore proposed, in particular, that the active rectifier be controlled both as a function of the position of the rotor and as a function of the number of pole pairs of the generator, in particular in order to reduce the sound emissions of the generator.

It is preferably proposed that the generator, in particular the stator, comprises a first 3-phase winding system and a second 3-phase winding system which is preferably offset in particular by 30° with respect to the first, and the first 3-phase winding system is controlled as a function of a first electrical angle, and the second 3-phase winding system is controlled as a function of a second electrical angle, wherein the second electrical angle is different from the first electrical angle, and is phase-shifted, in particular by 30°, with respect to the first electrical angle.

It is therefore further proposed to implement the generator with two 3-phase stator systems, in order to reduce the sound emissions of the generator even further. For this purpose, it is, in particular, proposed to arrange the two electrical stators with a 30° offset in their phase.

The modulation and/or addition are/is preferably carried out by means of n-th harmonic electrical oscillation, in order to minimize an m-th harmonic, mechanical oscillation of the generator, preferably where n=m/2 and m=12.

In one particularly preferred embodiment, the operational oscillations which occur are therefore minimized by twelve times the electrical frequency by virtue of the fact that modulation or addition is carried out with the sixth harmonic.

The core of the concept here is that the partial currents lq1 and lq2 are not changed or modulated identically to the frequency of the twelfth harmonic but rather the partial currents of the two partial systems, that is to say the two stators, are changed or modulated with the frequency of the sixth harmonic.

The method preferably further comprises the steps: phase shifting an AC component of the q coordinate by a predetermined phase angle, wherein the phase angle is preferably 180°, and/or phase shifting the electrical angle by a predetermined phase angle, wherein the phase angle is preferably 30°.

The active rectifier is preferably controlled by means of abc coordinates which are back-transformed from the changed and/or modulated d coordinate and preferably the q coordinate, comprising at least one a coordinate which causes additional rotating fields to be produced, in particular in the radial direction in the air gap of the generator, preferably with the $5^{th}$ and/or $7^{th}$ harmonic of the electrical frequency.

It is therefore particularly preferably proposed to change or modulate the currents of two partial systems with the frequency of the $6^{th}$ harmonic. The generator is therefore preferably provided with two electrical stators, as described above or below.

The amplitude of the modulation of the two partial systems is preferably identical here.

The result is the production of additional rotating fields in the radial direction in the air gap of the generator with the electrical frequency of the $5^{th}$ and $7^{th}$ harmonic.

This ultimately affects the $12^{th}$ harmonic of the magnetic radial forces which are present.

The active rectifier preferably comprises a first 3-phase module and a second 3-phase module, wherein the first 3-phase module is assigned to a first electrical stator, and the second 3-phase module is assigned to a second electrical stator.

In one preferred embodiment, a plurality of 3-phase rectifiers are therefore used. The use of two identical modules is advantageous here, as a result of which the active rectifier is made more favorable over the entire system.

Alternatively it is proposed to use a 6-phase rectifier for the two stators. An advantage here the 6-phase rectifier is the easier to control in comparison with the two 3-phase modules.

In addition, it is proposed that the two methods as described above or below should be used together, in particular one for the d coordinate and one for the q coordinate. A control unit of a wind turbine is also proposed, wherein the wind turbine has at least one generator which comprises a stator with a rotation axis about which a or the rotor is mounted, wherein the stator is electrically connected to an active rectifier which can be actuated by means of an actuation unit.

The control unit comprises here at least one position module for determining a mechanical position of the rotor with respect to the stator and is configured to output an electrical position signal which has been determined from the mechanical position of the rotor. For this purpose, the position module comprises, for example, an optical sensor which is configured to sense a rotational position of the rotor, and a processing unit which is configured to determine an electrical angle from the sensed rotational position.

In addition, the control unit also comprises a transformation module for predefining DC components of rotor-fixed d and q coordinates for at least one 3-phase stator current.

The transformation module is preferably configured here at least to carry out a d/q transformation and to make available the d and q coordinates, determined from the transformation, as DC components, for example, as $I_d$ and $I_q$.

In addition, the control unit also comprises a damping module for modulating and/or adding at least one AC component onto a d and/or q coordinate.

The damping module is therefore configured at least to determine an AC component as a function of an electrical position signal, preferably as a function of an electrical angle, which provides conclusive information about the mechanical position of the rotor with respect to the stator.

Moreover, the damping module is connected to the transformation module in such a way that the changed or modulated d coordinate and/or q coordinate which has a DC component and an AC component can be generated, in particular in order to make available the changed or modulated d coordinate and/or q coordinate of an actuation unit of the active rectifier.

It is therefore, in particular, proposed to predefine to the actuation unit of the active rectifier a changed or modulated d coordinate and/or q coordinate which comprises both a DC component and an AC component, wherein the AC component is provided to reduce the sound emissions of the generator.

In order to control the active rectifier as a function of this changed or modulated d coordinate and/or q coordinate, the actuation unit is configured at least to transform the changed or modulated d coordinate and/or q coordinate back into a 3-phase coordinate, in particular in such a way that each of the three phases is actuated separately.

The damping module preferably has for this purpose a multiplication means which acts on the electrical position signal in order, in particular, to make available a changed electrical position signal.

It is therefore also proposed to multiply the electrical angle of the position sensing means with a multiple in order to correspondingly address corresponding generator properties and/or the oscillation which is to be reduced. In one preferred embodiment the multiple comprises six.

The damping module preferably has an offset which acts on the electrical position signal, in particular on the changed electrical position signal, as a function of a working characteristic curve of the wind turbine by means of addition, in order to make available an offset electrical position signal.

The damping module preferably comprises a trigonometric function which outputs an essentially sinusoidal signal as a function of the electrical position signal, in particular as a function of the offset electrical position signal, in order to make available a changing electrical position signal.

The damping module preferably has an amplitude modification means which acts on the electrical position signal, in particular on the changing electrical signal, as a function of a working characteristic curve of the wind turbine, in order to make available the AC component.

The control unit preferably also comprises a phase shifter which is configured to shift the electrical position signal by a predetermined absolute value, in particular by 30°, in its phase, and to make it available at the actuation unit.

The control unit preferably also comprises a phase shifting module which is configured to shift the changed or modulated d coordinate and/or q coordinate by a predetermined absolute value, in particular by 180°, in its phase, and/or to multiply it by a predetermined absolute value, in particular −1, in particular by a first changed or modulated d coordinate and/or q coordinate for a first 3-phase stator current of a first, 3-phase winding system of the stator of the wind turbine and a second changed or modulated d coordinate and/or q coordinate for a second 3-phase stator current of a second, 3-phase winding system of the stator of the wind turbine, wherein the first winding system and the second winding system are preferably phase shifted by 30°.

It is therefore proposed, in particular, that the generator has two electrical stators which are offset by 30° with respect to one another. As a result, for example, the emission of sound can be reduced once more. In addition, this also simplifies the actuation of the active rectifier, since it has a 6-phase input or a double 3-phase input.

Therefore, in particular two control units are proposed which can be accommodated together in a control system of a wind turbine, specifically a control unit for modulating a d component and a control unit for modulating a q component.

A wind turbine is also proposed comprising a control unit which is configured to carry out a method as described above or below, or alternatively a control unit as described above or below.

In one particular preferred embodiment, this wind turbine comprises a generator which comprises a stator with a rotational axis about which a or the rotor is mounted, wherein the stator is electrically connected to an active rectifier, which can be actuated by means of an actuation unit, and the actuation unit for the active rectifier.

The generator of the wind turbine is preferably embodied as an internal rotor here.

The generator, in particular the stator, also comprises two winding systems which are phase shifted by 30° and are each connected to a 3-phase module of the active rectifier.

In addition, the actuation unit is configured to carry out a first reverse transformation of a first modulated q coordinate and of a d coordinate and of a first electrical position signal for the first 3-phase module of the active rectifier and a second reverse transformation of a second modulated q coordinate and of the d coordinate and of a second electrical position signal for the second 3-phase module of the active rectifier.

The second modulated q coordinate is phase shifted here by 180° with respect to the first modulated q coordinate, and the second electrical position signal is phase shifted by 30° with respect to the first electrical position signal.

Therefore, in particular a 6-phase generator with two 3-phase current systems which are offset by 30° is proposed, wherein individual d/q transformations are implemented for each system.

For the purpose of control, the variables $I_{d1}$ and $I_{q1}$ are used for the first system and $I_{d2}$ and $I_{q2}$ are used for the second system which is shifted by 30°.

It is therefore proposed to modulate the torque-forming components of the currents $I_{q1}$ and $I_{q2}$, specifically, in particular, in such a way that the operational oscillations which occur, in particular those with a frequency of 12 times the electrical frequency, are therefore minimized.

For this purpose, it is in particular proposed that the currents $I_{q1}$ and $I_{q2}$ are not modulated identically to the frequency of the $12^{th}$ harmonic but rather the currents of the two partial systems are modulated with the frequency of the $6^{th}$ harmonic.

For this purpose, a phase shift, which is preferably 180°, is also proposed in the modulation.

The teaching brings about, in particular, stabilization of the torque in a wide working range of the wind turbine and minimization of the slot cogging torque.

A wind turbine is proposed comprising a control unit which is configured to carry out a method as described above or below or alternatively a control unit as described above or below.

In one particularly preferred embodiment, this wind turbine comprises a generator which comprises a stator with a rotational axis via which a or the rotor is mounted, wherein the stator is electrically connected to an active rectifier which can be actuated by means of an actuation unit, and the actuation unit for the active rectifier.

The generator of the wind turbine is preferably embodied here as an internal rotor.

The generator, in particular the stator, also comprises two winding systems which are phase shifted by 30° C. and which are each connected to a 3-phase module of the active rectifier.

In addition, the actuation unit is configured to carry out a first reverse transformation of a first changed or modulated d coordinate and of a q coordinate and of a first electrical position signal for the first 3-phase module of the active rectifier and a second reverse transformation of a second changed or modulated d coordinate and of the q coordinate and of a second electrical position signal for the second 3-phase module of the active rectifier.

The second changed or modulated d coordinate is phase shifted here by 180° with respect to the first changed or modulated d coordinate, and the second electrical position signal is phase shifted by 30° with respect to the first electrical position signal.

Therefore, in particular a 6-phase generator with two 3-phase current systems which are offset by 30° is proposed, wherein individual d/q transformations are implemented for each system.

For the purpose of control, the variables ld1 and lq1 are used for the first system, and ld2 and lq2 are used for the second system which is shifted by 30°.

It is therefore proposed to change or modulate the currents ld1 and ld2 which influence the magnetic excitation, specifically, in particular, in such a way that the operational oscillations which occur, in particular those with a frequency of 12 times the electrical frequency, are minimized.

For this purpose it is in particular proposed that the currents ld1 and ld2 are not changed or modulated identically to the frequency of the $12^{th}$ harmonic but rather the currents of the two partial systems are changed or modulated with the frequency of the $6^{th}$ harmonic.

For this purpose, a phase shift in modulation, which is preferably 180°, also proposed.

The teaching in particular brings about a reduction in the sound emissions of the generator of a wind turbine.

In a further embodiment, the wind turbine is configured to carry out both methods as described above or below, in particular to carry them out simultaneously.

BRIEF DESCRIPTION OF THE SEVERAL VIEWS OF THE DRAWINGS

The present invention will now be explained in more detail below by way of example on the basis of exemplary embodiments and with reference to the accompanying figures, of which.

DETAILED DESCRIPTION

Figure 1:
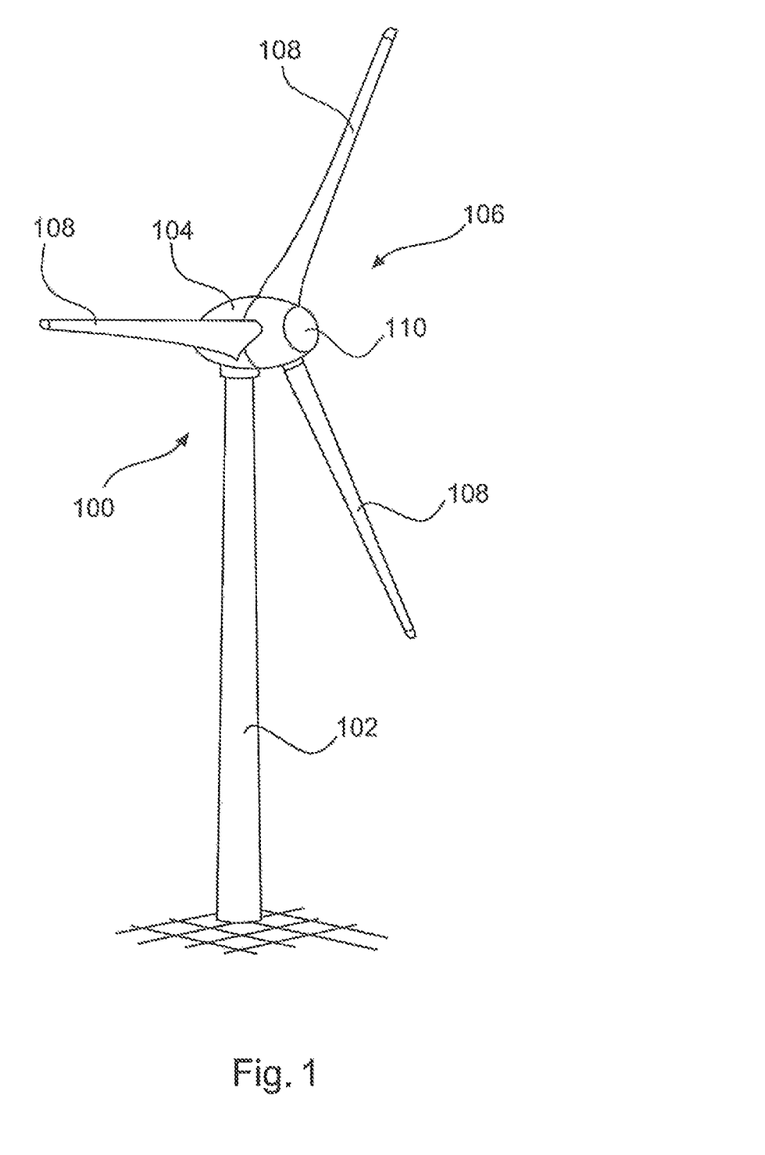
FIG. 1 shows a schematic view of a wind turbine according to an embodiment.

FIG. 1 shows a schematic view of a wind turbine 100.

The wind turbine 100 has for this purpose a tower 102 and a nacelle 104. An aerodynamic rotor 106 with three rotor blades 108 and a spinner 110 are arranged on the nacelle 104. The rotor 106 is made to rotate by the wind during operation and as a result drives a generator in the nacelle 104.

In order to operate the wind turbine, a control unit (controller) as described above or below and an actuation unit as described above or below are also provided.

The generator additionally comprises a stator with a rotational axis, and a rotor which rotates around this rotational axis, preferably is an internal rotor, wherein the stator is electrically connected to an active rectifier which can be actuated by an actuation unit (actuator).

The stator has in this context two electrical winding systems which are phase shifted by 30° and are each connected to a 3-phase module (circuit) of the active rectifier. The generator is therefore of a 6-phase design.

Furthermore, the actuation unit is configured to carry out a first reverse transformation of a first modulated q coordinate and of a d coordinate and of a first electrical position signal for the first 3-phase module (circuit) of the active rectifier and a second reverse transformation of a second modulated q coordinate and of the d coordinate and of a second electrical position signal for the second 3-phase module (circuit) of the active rectifier, wherein the second modulated q coordinate is phase shifted by 180° with respect to the first modulated q coordinate, and the second electrical position signal is phase shifted by 30° with respect to the first electrical position signal.

Figure 2:
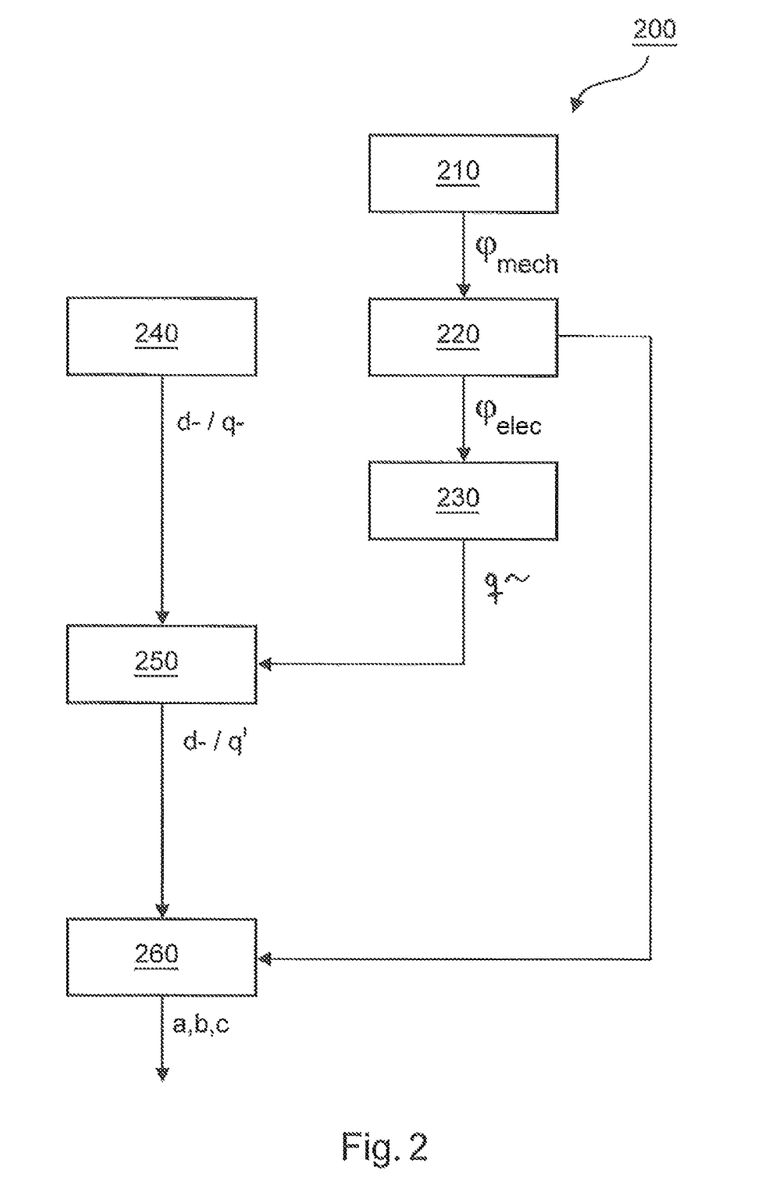
FIG. 2 shows a schematic sequence of a method according to an embodiment.

FIG. 2 shows a schematic sequence of a method according to an embodiment 200.

In a first step, a mechanical position of the rotor with respect to the stator is determined. This is preferably carried out by means of a mechanical angle $\varphi_{mech}$. The mechanical angle can be determined, for example, by means of a position sensing means (position sensor). This is indicated by block 210.

Then, the mechanical angle $\varphi_{mech}$ is converted into an electrical angle $\varphi_{elec}$. This can also be done by means of the position sensing means and as a function of the mechanical position and the number of pole pairs of the generator. This is indicated by the block 220.

In addition, an AC component q~ is determined as a function of the mechanical position of the rotor, in particular as a function of the electrical angle $\varphi_{elec}$. This is indicated by block 230.

Furthermore, DC components are predefined for the rotor-fixed d coordinate d– and q coordinate q– for the two 3-phase stator currents, for example, by means of a d/q transformation. This is indicated by block 240.

Then, the determined AC component q~ is modulated onto the predefined DC component of the q coordinate q− so that a modulated q coordinate q' is generated which has a DC component q− and an AC component q~. This is indicated by block 250.

The active rectifier itself is then controlled as a function of the modulated q coordinate q' and the d coordinate d−. This can be done, for example, by means of a reverse transformation of the coordinate d− and q' into 3-phase coordinates a, b, c. This is indicated by the block 260.

In one preferred embodiment, the active rectifier is additionally controlled as a function of the electrical angle $\varphi_{elec}$.

Figure 3:
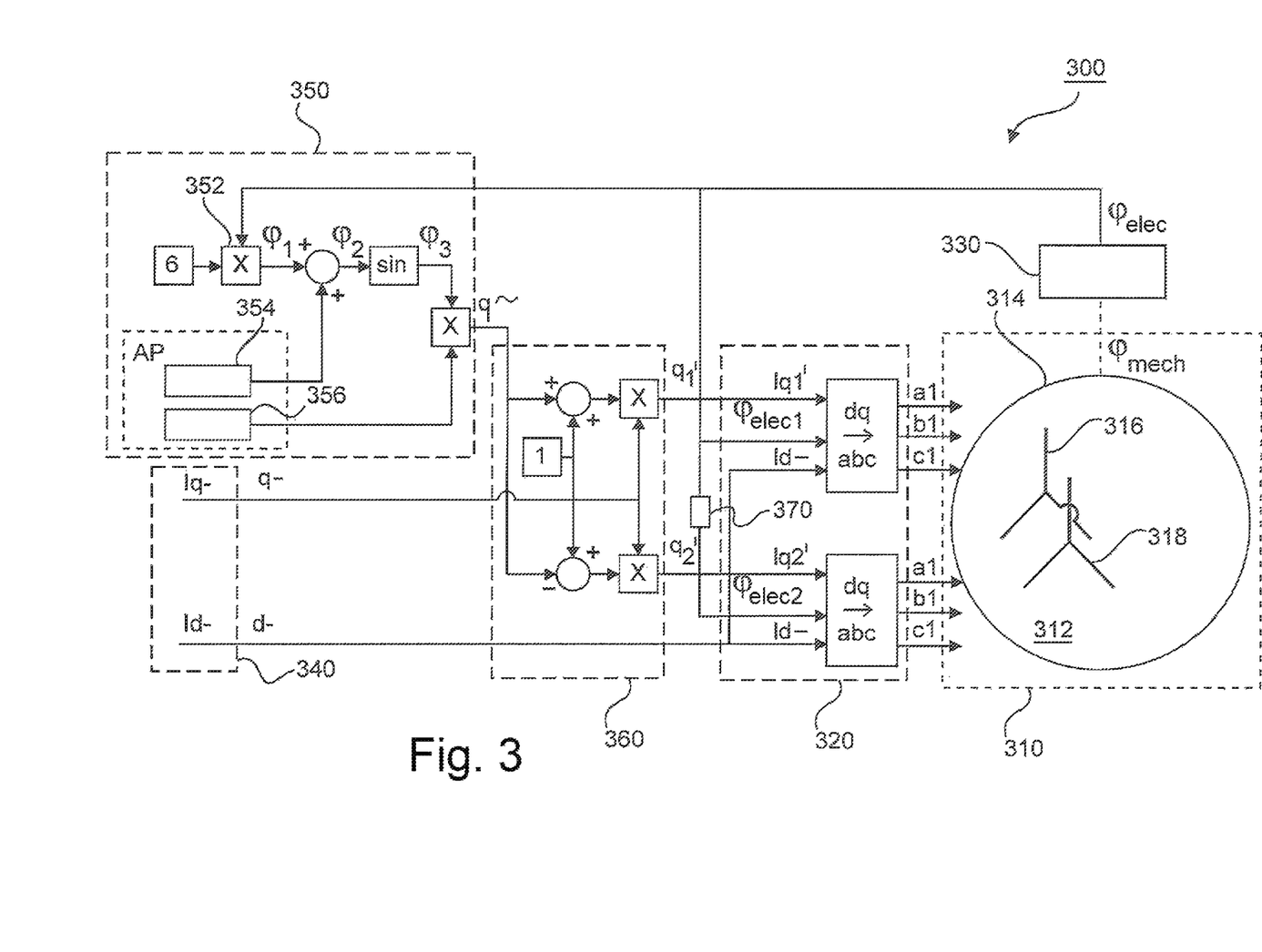
FIG. 3 shows a schematic design of a control unit of a wind turbine according to an embodiment.

FIG. 3 shows a schematic design of a control unit (controller) of a wind turbine according to an embodiment 300. In particular, FIG. 3 shows a structure of such a control unit.

The wind turbine comprises a generator 310. The generator comprises a mechanical stator 312 and a mechanical rotor 314. The generator 310 is embodied here as an internal rotor, i.e., the rotor 314 is arranged within the stator 312.

The mechanical stator 312 has two 3-phase winding systems which are electrically connected to an active rectifier and preferably phase shifted by 30°.

The generator 310 is therefore also embodied with 6 phases.

The actuation of the active rectifier or of the electrical phase of the wind turbine is carried by means of the actuation unit (actuator) 320.

This control unit 320 itself is configured here to carry out a first reverse transformation $a_1$, $b_1$, $c_1$ of a first modulated q coordinate $I_{q1}$' and a d coordinate d− and of a first electrical position signal $\varphi_{elec1}$ for the first 3-phase module of the active rectifier and a second reverse transformation $a_2$, $b_2$, $c_2$ of a second modulated q coordinate $I_{q2}$' and of the d coordinate d− and of a second electrical position signal $\varphi_{elec2}$ for the second 3-phase module of the active rectifier, wherein the second modulated q coordinate $I_{q2}$' is phase shifted by 180° with respect to the first modulated q coordinate $I_q$, and the second electrical signal $\varphi_{elec2}$ is phase shifted by 30° with respect to the first electrical position signal $\varphi_{elec1}$.

In order to carry out the method, a position module (circuit) 330 is also proposed which is configured to output an electrical position signal $\varphi_{elec}$ from a mechanical position $\varphi_{mech}$ of the rotor 314 with respect to the stator 312.

In addition, the control unit (controller) 300 comprises a transformation module (circuit) 340 which is configured to predefine DC components for rotor-fixed d coordinates d− and q coordinates q−, in particular for the two 3-phase stator currents of the generator 310.

Furthermore, the control unit 300 comprises a damping module (circuit) 350 for modulating at least one AC component q~ onto a q coordinate q−, wherein the AC component q~ is determined as a function of the electrical position signal $\varphi_{elec}$, and the damping module 350 is connected to the transformation module 340 in such a way that a modulated q coordinate q' is generated which has a DC component q− and an AC component q~ which is made available for the actuation unit.

The damping module 350 itself comprises for this purpose a multiplication means (multiplier) 352 which acts on the electrical position signal $\varphi_{elec}$ in order to make available a changed electrical position signal φ1. For this purpose, the electrical position signal $\varphi_{elec}$ is multiplied by the factor 6 in order to address the operational oscillation of the generator 310 of the 12$^{th}$ harmonic, that is to say that which corresponds to 12 times the electrical frequency of the generator 310.

Furthermore, the damping module 350 comprises an offset 354 which acts on the changed electrical position signal φ1 of a working characteristic curve AP of the wind turbine by means of an addition to the electrical position signal, in order to make available an offset electrical position signal φ2.

In addition, the damping module 350 also has a trigonometric function sin which makes available an essentially sinusoidal signal as a function of the offset electrical position signal φ2. This signal can also be referred to as a changing electrical position signal φ3.

The damping module 350 also has an amplitude modification means (amplifier or modulator) 356 which acts on the changing electrical position signal φ3 as a function of a working characteristic curve AP of the wind turbine, in order to make available the AC component q~.

Furthermore, the control unit 300 comprises a phase shifting module (circuit) 360 and a phase shifter 370, in order to make available the AC component q~ for the two phase shifted electrical stators 316, 318.

The phase shifting module 360 is configured for this purpose to shift the modulated q coordinate q~ by a predetermined absolute value of 180 in its phase, in order to make available a first modulated q coordinate $q_1$' for the first 3-phase stator current of the first, 3-phase winding system of the stator 316 and a second modulated q coordinate $q_2$' for the second 3-phase stator current of the second, 3-phase winding system of the stator 318, wherein the first winding system 316 and the second winding system 318 are phase shifted by 30°.

For this purpose, the phase shifter 370 is configured to shift the electrical position signal $\varphi_{elec}$ by a predetermined absolute value, in particular buy 30°, in its phase and to make it available at the actuation unit 320.

The actuation unit 320 itself then transforms back the variables $I_{q1}$', $\varphi_{elec1}$, $I_d$− to form the 3-phase coordinates $a_1$, $b_1$, $c_1$ and the variables $I_{q2}$', $\varphi_{elec2}$ and $I_d$− to form the 3-phase coordinates $a_2$, $b_2$, $c_2$.

The field-oriented closed-loop control is therefore used to control the active rectifier.

This permits the stator currents to be predefined in rotor-fixed d/q coordinates.

The currents ld− and lq− are therefore essentially equivalent variables.

In addition, a 6-phase generator 310 is proposed with 2 3-phase current systems which are offset by 30°, wherein each system has individual d/q transformations.

For the purpose of control, the variables $l_{d1}$', $l_{q1}$' are then available for the one system 316, and $l_{d2}$' and $l_{q2}$' for the other system which is offset by 30°.

It is therefore proposed to modulate the torque-forming components of the currents, specifically in such a way that the operational oscillations which occur with a frequency 12*f_el are therefore minimized.

The core point here is that the currents $l_{q1}$' and $l_{q2}$' are not modulated identically to the frequency of the 12$^{th}$ harmonic but rather to modulate the currents of the two partial systems with the frequency of the 6$^{th}$ harmonic. The phase shift of the modulation is 180°.

This can bring about stabilization of the torque and compensation of the slot cogging torque.

Figure 4:
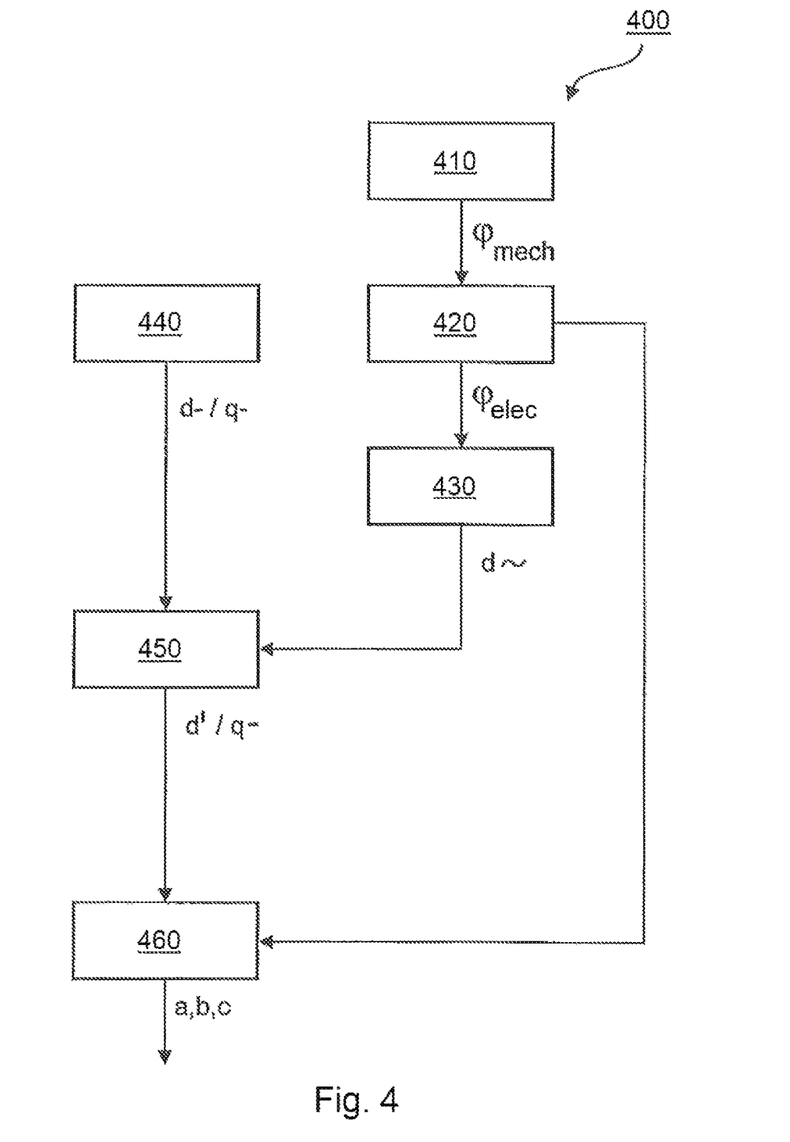
FIG. 4 shows a schematic sequence of a further method according to an embodiment.

FIG. 4 shows a schematic sequence of a further method according to an embodiment 400.

In a first step, a mechanical position of the rotor is determined with respect to the stator. This is preferably done by means of a mechanical angle φmech. The mechanical angle can be determined, for example, by a position sensing means. This is indicated by block 410.

The mechanical angle φmech is then converted into an electrical angle φelec. This can also be done by the position sensing means and as a function of the mechanical position and the number of pole pairs of the generator. This is indicated by block 420.

In addition, an AC component d~ is determined as a function of the mechanical position of the rotor, in particular as a function of the electrical angle φelec. This is indicated by block 430.

Furthermore, DC components for the rotor-fixed d coordinates d− and q coordinates q− are predefined for the two 3-phase stator currents, for example, by means of a d/q transformation. This is indicated by block 440.

Then, the determined AC component d is modulated or added onto the predefined DC component of the d coordinate d−, so that a changed or modulated d coordinate d', which has a DC component d− and an AC component d~, is generated. This is indicated by block 450.

The active rectifier itself is then controlled as a function of the changed or modulated d coordinate d' and the q coordinate q−. This can be done, for example, by means of a reverse transformation of the coordinate d− and q' into 3-phase coordinates a, b, c. This is indicated by block 460.

This procedure can also be described, for example, on the basis of the following equations:

$$i_{q1} = i_{q11}$$

$$i_{d1} = i_{d11} + i_{d6}\sin(6\beta + \varphi_{d6})$$

$$i_{q2} = i_{q11}$$

$$i_{d2} = i_{d11} - i_{d6}\sin(6\beta + \varphi_{d6})$$

$$i_{a1} = i_{q11}\cos\beta + i_{d11}\sin\beta + \frac{i_{d6}}{2}\cos(5\beta + \varphi_{d6}) - \frac{i_{d6}}{2}\cos(7\beta + \varphi_{d6})$$

$$i_{a2} = i_{q11}\cos\left(\beta - \frac{\pi}{6}\right) + i_{d11}\sin\left(\beta - \frac{\pi}{6}\right) -$$

$$\frac{i_{d6}}{2}\cos\left(5\beta + \frac{\pi}{6} + \varphi_{d6}\right) + \frac{i_{d6}}{2}\cos\left(7\beta - \frac{\pi}{6} + \varphi_{d6}\right)$$

wherein this modulation is selective for the $12^{th}$ harmonic.

In one preferred embodiment, the active rectifier is additionally controlled as a function of the electrical angle φelec.

Figure 5:
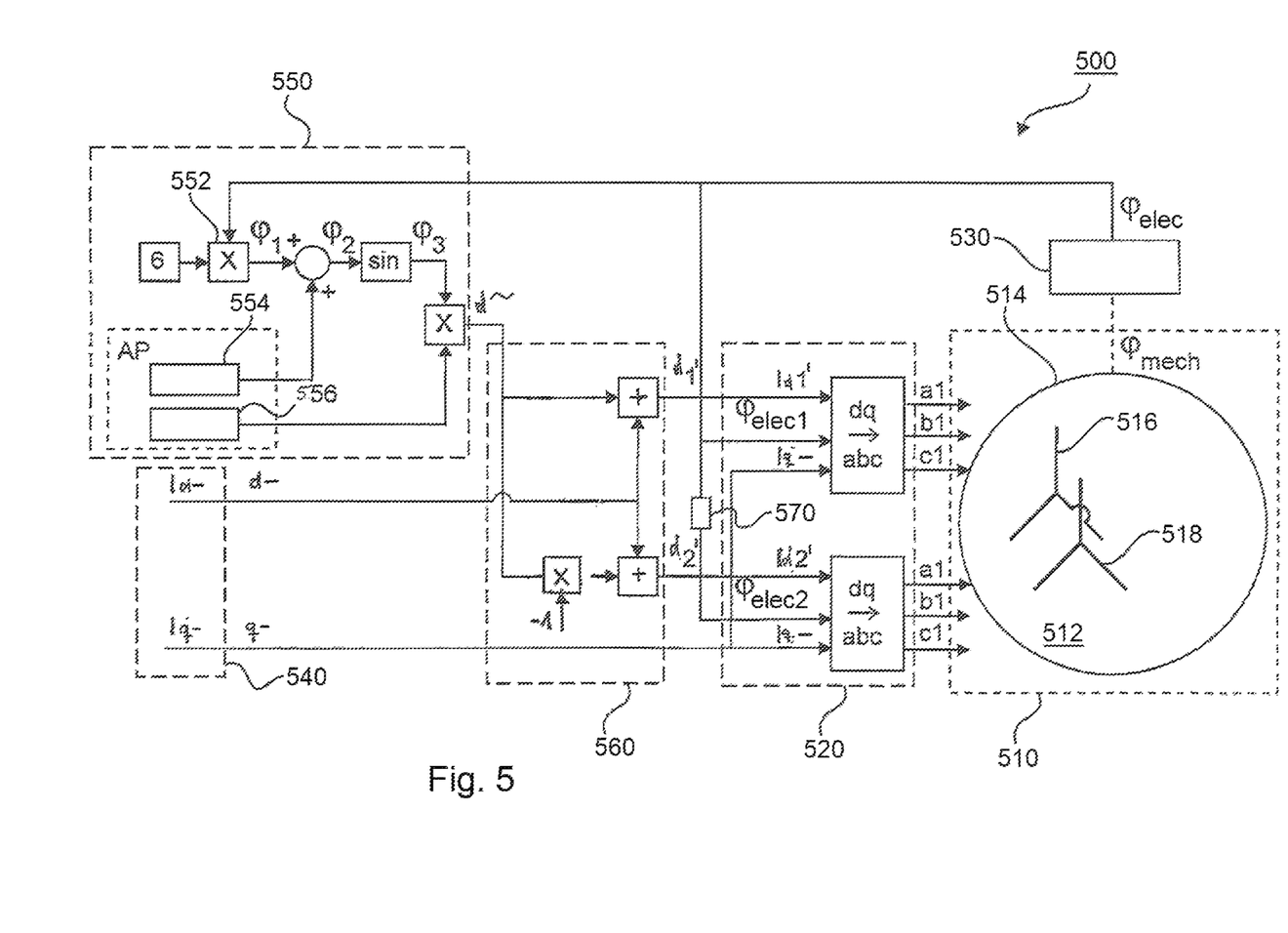
FIG. 5 shows a schematic design of a further control unit of a wind turbine according to an embodiment.

FIG. 5 shows a schematic design of a further control unit of a wind turbine according to an embodiment 500. In particular, FIG. 5 shows a structure of such a control unit.

The wind turbine comprises a generator 510. The generator comprises a mechanical stator 512 and a mechanical rotor 514. The generator 510 is embodied here as an internal rotor, i.e., the rotor 514 is arranged within the stator 512.

The mechanical stator 512 has two 3-phase winding systems which are electrically connected to an active rectifier and preferably phase shifted by 30°.

The generator 510 is therefore also embodied with 6 phases.

The active rectifier or the electrical phase of the wind turbine is actuated by means of the actuation unit 520.

This control unit 520 itself is configured here to carry out a first reverse transformation a1, b1, c1 of a first changed or modulated d coordinate Id1' and of a q coordinate q− and of a first electrical position signal φelec1 for the first 3-phase module of the active rectifier and a second reverse transformation a2, b2, c2 of a second changed or modulated d coordinate Id2' and of the q coordinate q− and of a second electrical position signal φelec2 for the second 3-phase module of the active rectifier, wherein the second changed or modulated d coordinate Id2' is phase shifted by 180° with respect to the first changed or modulated d coordinate Id1', and the second electrical position signal φelec2 is phase shifted by 30° with respect to the first electrical position signal φelec1.

In order to carry out the method, a position module (circuit) 530 is also provided which is configured to output an electrical position signal φelec from a mechanical position φmech of the rotor 514 with respect to the stator 512.

In addition, the control unit 300 comprises a transformation module (circuit) 540 which is configured to predefine DC components for rotor-fixed d coordinates d−, and q coordinates q−, in particular for the two 3-phase stator currents of the generator 510.

Furthermore, the control unit 500 comprises a damping module (circuit) 550 for modulating and/or adding at least one DC component d~ to a d coordinate d−, wherein the DC component d~ is determined as a function of the electrical position signal φelec, and the damping module 550 is connected to the transformation module 540 in such a way that a changed or modulated d coordinate d' is generated which has a DC component d− and an AC component d~ and which is made available for the actuation unit.

The damping module 550 itself comprises for this purpose a multiplication means (multiplier) 552 which acts on the electrical position signal φelec, in order to make available a changed electrical position signal φ1. For this purpose, the electrical position signal φelec is multiplied by the factor 6, in order to address the operational oscillation of the generator 510 of the $12^{th}$ harmonic, that is to say that which corresponds to 12 times the electrical frequency of the generator 510.

Furthermore, the damping module 550 comprises an offset 554 which acts on the changed electrical position signal φ1 as a function of a working characteristic curve AP of the wind turbine by means of addition to the electrical position signal, in order to make available an offset electrical position signal φ2.

In addition, the damping module 550 also comprises a trigonometric function sin which makes available an essentially sinusoidal signal as a function of the offset electrical position signal φ2. This signal can also be referred to as a changing electrical position signal φ3.

The damping module 550 also has an amplitude modification means 556 which acts on the changing electrical position signal φ3 as a function of a working characteristic curve AP of the wind turbine, in order to make available the AC component d~.

Furthermore, the control unit 500 comprises a phase shifting module 560 and a phase shifter 570 in order to make available the AC component d~ for the two phase shifted electrical stators 516, 518.

The phase shifting module 560 is for this purpose configured to shift the changed or modulated d coordinate d~ by a predetermined absolute value of 180° in its phase, in order to make available a first changed or modulated d coordinate d1' for the first 3-phase stator current of the first, 3-phase winding system of the stator 516 and a second changed or modulated d coordinate d2' for the second 3-phase stator current of the second, 3-phase winding system of the stator 518, wherein the first winding system 516 and the second winding system 518 are phase shifted by 30°.

For this purpose, the phase shifter 570 is configured to shift the electrical position signal φelec by a predetermined absolute value, in particular by 30°, in its phase, and to make it available at the actuation unit 520.

The actuation unit 320 itself then transforms back the variables Id1', φelec1, Iq− to form the 3-phase coordinates a1, b1, c1 and the variables Id2', φelec2 and Iq− to form the 3-phase coordinates a2, b2, c2.

A field-oriented, closed-loop control is then used to control the active rectifier.

This permits the stator currents to be predefined in rotor-fixed d/q coordinates.

The currents Id− and Iq− are therefore essentially equivalent variables.

In addition, a 6-phase generator 510 is proposed with 2 3-phase current systems which are offset by 30°, wherein each system has individual d/q transformations.

For the purpose of control, the variables Iq−, Id1' are then available for the one system 516 and Iq− and Id2' for the other system which is offset by 30°.

It is therefore proposed to change or modulate the torque-forming components of the currents, specifically in such a way that the operational oscillations which occur are therefore minimized with a frequency 12*f_el.

The core point here is that the currents Id1' and Id2' are not changed or modulated identically to the frequency of the 12$^{th}$ harmonic but rather to change or to modulate the currents of the two partial systems with the frequency of the 6$^1$ harmonic. The phase shift of the modulation is 180 here.

The result is the generation of additional rotating 3-phase current fields in the radial direction in the air gap of the generator with the electrical frequency of the 5$^{th}$ and 7$^{th}$ harmonics, which ultimately affects the 12$^{th}$ harmonic of the magnetic radial pulses which are present.

As a result, the sound emissions of the generator can be significantly minimized.

Figure 6:
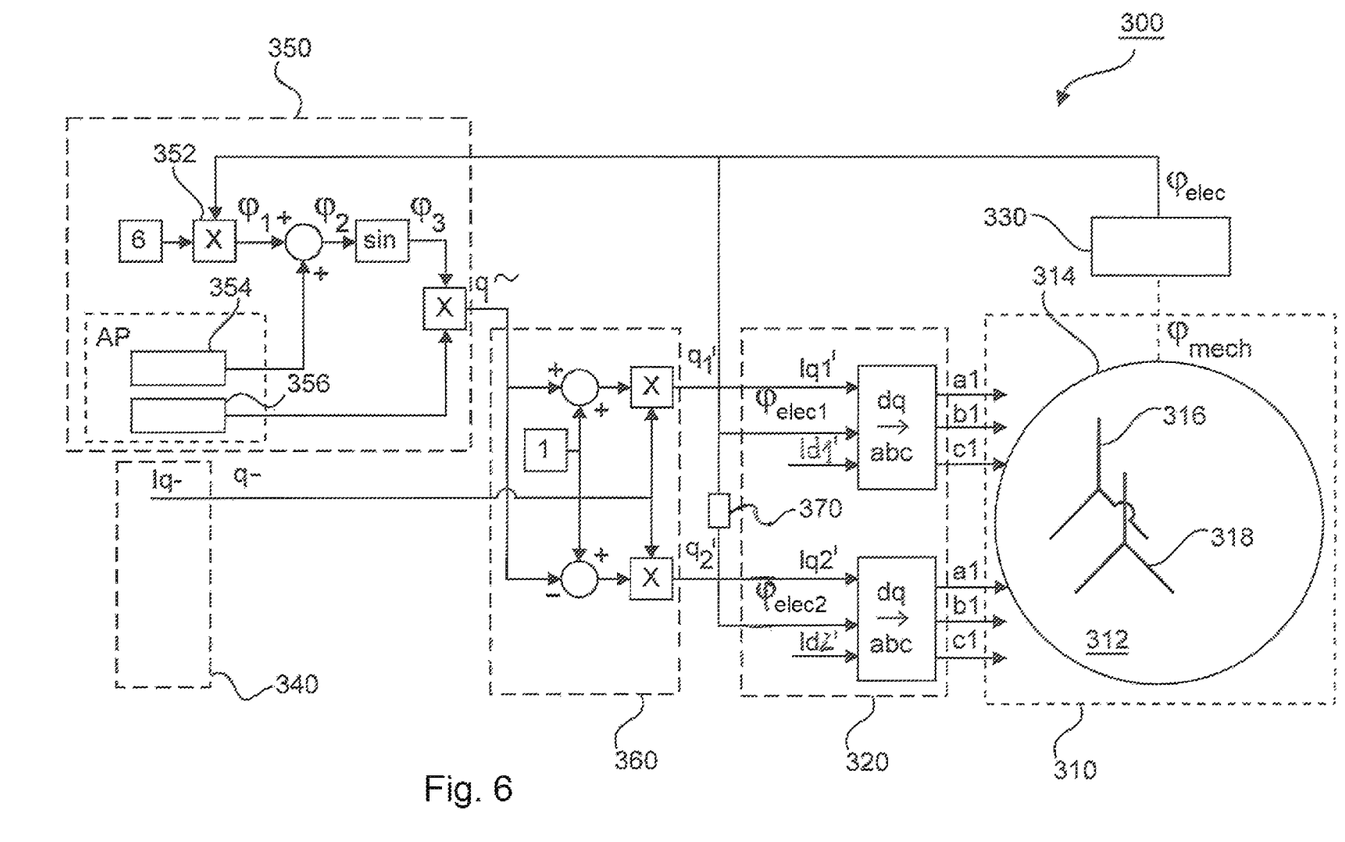
FIG. 6 shows a schematic design of an alternative control unit of a wind turbine according to an embodiment.

FIG. 6 shows a schematic design of an alternative control unit of a wind turbine according to an embodiment.

In particular, FIG. 6 shows an alternative configuration to the control unit shown in FIG. 3.

In this context, in particular the variables of the d component, that is to say Id1' and Id2', are also made available by a method as described above.

The control unit 500 is therefore configured to carry out both methods as described above and in particular to make available both a modulated d component and a modulated q component.

Figure 7:
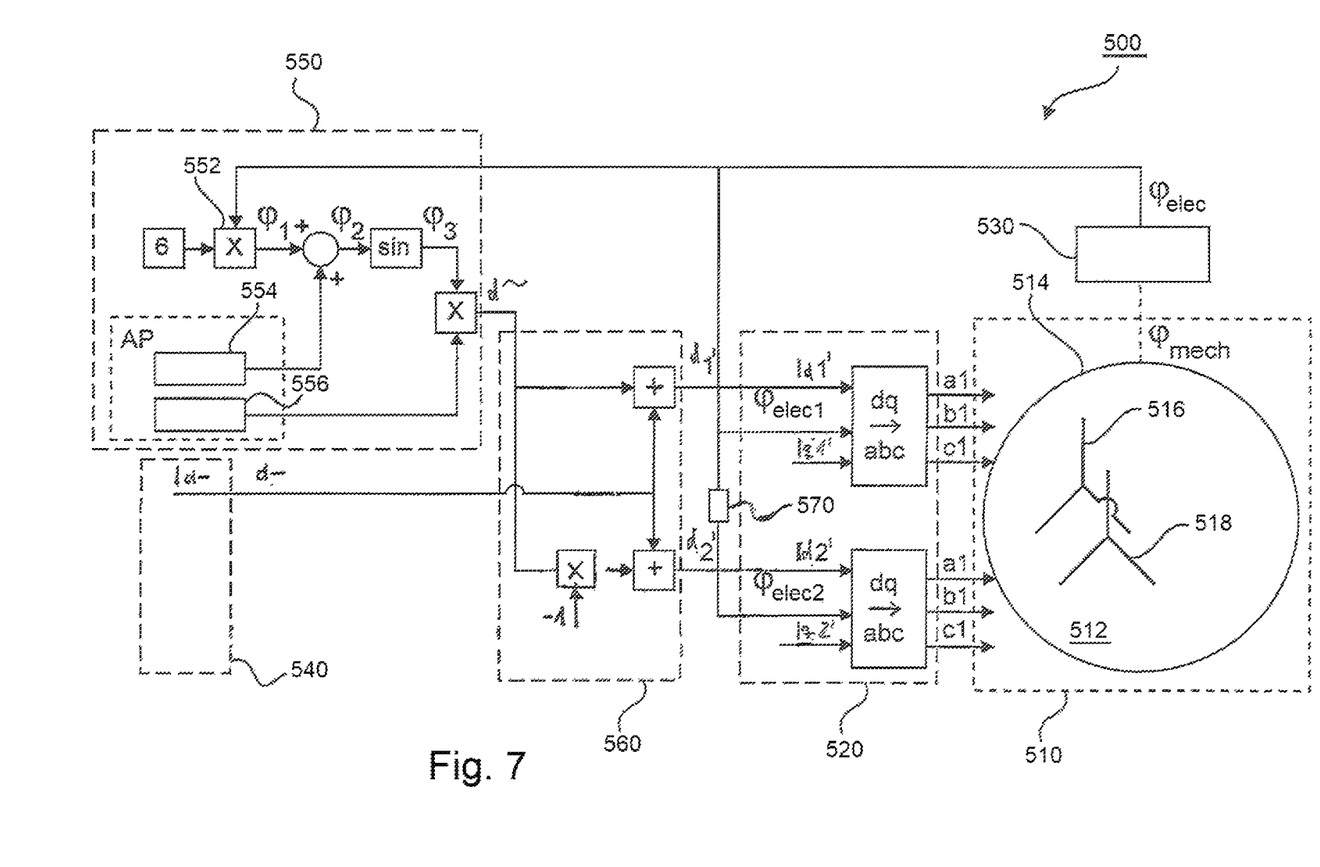
FIG. 7 shows a schematic design of a further alternative control unit of a wind turbine according to an embodiment.

FIG. 7 shows a schematic design of a further alternative control unit of a wind turbine according to an embodiment.

In particular, FIG. 7 shows an alternative configuration to the control unit shown in FIG. 5.

In this context, in particular the variables of the q component, that is to say Iq1' and Iq2', are also made available by a method as described above.

The control unit 500 is therefore configured to carry out both methods as described above and, in particular, to make available both a modulated d component and a modulated q component.

FIGS. 6 and 7 therefore show, in particular, a common use of the methods as described above, by means of a control unit which is configured, in particular, to carry out the methods shown in FIGS. 2 and 4.

The invention claimed is:

1. A method for controlling, using field-orientated closed-loop control, an active rectifier electrically connected to a stator of a generator of a wind turbine, the stator having a rotational axis about which the rotor is mounted, comprising:

determining a mechanical position of the rotor with respect to the stator;
predefining directed current (DC) components of rotor-fixed d- and q coordinates for at least one three-phase stator current;
determining an alternating current (AC) component for the q coordinate and/or the d coordinate at least based on the mechanical position of the rotor;
modulating and/or adding:
the determined AC component of the q coordinate to the predefined DC component of the q coordinate to obtain a q coordinate having DC and AC components, and/or
the determined AC component of the d coordinate to the predefined DC component of the d coordinate to obtain a d coordinate having DC and AC components, and
controlling the active rectifier at least based on the obtained q coordinate and/or the obtained d coordinate.

2. The method as claimed in claim 1, comprising:
determining the AC component for the q coordinate and/or the d coordinate based on a working characteristic curve of the generator.

3. The method as claimed in claim 1, comprising:
acquiring an electrical angle as a function of the mechanical position of the rotor and the number of pole pairs of the generator; and
controlling the active rectifier based on the electrical angle.

4. The method as claimed in claim 1, wherein
the generator includes a first three-phase winding system and a second three-phase winding system,
the first three-phase winding system is controlled based on a first electrical angle,
the second three-phase winding system is controlled based on a second electrical angle, and
the second electrical angle is different from the first electrical angle and is phase-shifted with respect to the first electrical angle.

5. The method as claimed in claim 4, wherein the modulation and/or the addition is performed using an n-th harmonic electrical oscillation to minimize an m-th harmonic; mechanical oscillation of the generator, wherein n=m/2.

6. The method as claimed in claim 3, comprising:
phase shifting the AC component of the q coordinate and/or the AC component of the d coordinate by a predetermined phase angle, and/or
phase shifting the electrical angle by a predetermined phase angle.

7. The method as claimed in claim 1, wherein:
the active rectifier includes a first three-phase circuit and a second 3-phase circuit,
the first three-phase circuit is associated with a first electrical stator, and
the second three-phase circuit is associated with a second electrical stator.

8. The method as claimed in claim 1, comprising:
controlling the active rectifier using abc coordinates that are back-transformed from the obtained q coordinate and/or the obtained d coordinate, the abc coordinates including at least one a coordinate that causes additional rotating fields to be produced.

9. A controller for a wind turbine having at least one generator including a stator with a rotational axis about which a rotor is mounted, and the stator being electrically connected to an active rectifier actuated using an actuator, the controller comprising:

a position circuit configured to determine a mechanical position of the rotor with respect to the stator and output an electrical position signal, a transformation circuit configured to predefine DC components of rotor fixed d and q coordinates for at least one three-phase stator current, and a damping circuit configured to modulate and/or add at least one AC component to a q coordinate and/or modulate and/or add at least one DC component to a d component, wherein:

the AC component is determined based on the electrical position signal and/or the DC component is determined based on the electrical position signal, and the damping circuit is connected to the transformation circuit, at least one modulated q coordinate is generated which has the DC component and the AC component and is output to the actuator made available for the actuator, and/or at least one changed d coordinate is generated which has the DC component and the AC component and is output to the actuator.

10. The controller as claimed in claim 9, wherein the damping circuit has a multiplier configured to operate on the electrical position signal and generate a changed electrical position signal.

11. The controller as claimed in claim 10, wherein the damping circuit is configured to add an offset to the changed electrical position signal based on a working characteristic curve of the wind turbine to generate an offset electrical position signal.

12. The controller according to claim 11, wherein the damping circuit is configured to generate a sinusoidal signal based on the offset electrical position signal and output a changing electrical position signal.

13. The controller according to claim 12, wherein the damping circuit includes an amplitude modification circuit configured to operate on the changing electrical position signal and based on a working characteristic curve of the wind turbine to produce the AC component.

14. The controller as claimed in claim 9, further comprising:

a phase shifter configured to shift the electrical position signal by a predetermined absolute value and output the phase-shifted electrical position signal to the actuator.

15. The controller according to claim 9, further comprising:

a phase shifting circuit configured to shift the at least one modulated q coordinate by a predetermined absolute value and generate a first modulated q coordinate for a first three-phase stator current of a first three-phase winding system of the wind turbine and a second modulated q coordinate for a second three-phase stator current of a second three-phase winding system of the wind turbine, and/or a phase shifting circuit configured to multiply the at least one changed d coordinate by a predetermined absolute value and generate a first changed d coordinate for the first three-phase stator current of the first three-phase winding system of the wind turbine and a second changed d coordinate for the second three-phase stator current of the second three-phase winding system of the wind turbine.

16. A control system of the wind turbine, comprising: the controller as claimed in claim 9.

17. A wind turbine, comprising:

a generator including a stator with a rotational axis and a rotor mounted about the rotational axis, wherein the stator is electrically connected to an active rectifier, and an actuator for the active rectifier, wherein the generator includes two stators that are phase shifted by 30° and each connected to a three-phase module of the active rectifier, and the actuation unit is configured to:

perform a first reverse transformation of a first modulated q coordinate and a d coordinate and of a first electrical position signal for the first three-phase module of the active rectifier, and perform a second reverse transformation of a second modulated q coordinate and of the d coordinate and of a second electrical position signal for the second three-phase module of the active rectifier, wherein the second modulated q coordinate is phase shifted by 180° with respect to the first modulated q coordinate, and the second electrical position signal is phase shifted by 30° with respect to the first electrical position signal, and/or the actuation unit is configured to:

perform a first reverse transformation of a first changed d coordinate and of a q coordinate and of a first electrical position signal for the first three-phase module of the active rectifier, and a second reverse transformation of a second changed d coordinate and of the d coordinate and of a second electrical position signal for the second three-phase module of the active rectifier, wherein the second changed d coordinate is phase shifted by 180° with respect to the first changed d coordinate, and the second electrical position signal is phase shifted by 30° with respect to the first electrical position signal.

18. The method as claimed in claim 2, comprising: obtaining an amplitude and an offset for the AC component from the working characteristic curve.

19. The method as claimed in claim 8, wherein the additional rotating fields are produced in a radial direction in an air gap of the generator with the $5^{th}$ and/or $7^{th}$ harmonic of an electrical frequency.

\* \* \* \* \*